United States Patent [19]

Wake

[11] Patent Number: 5,508,693
[45] Date of Patent: Apr. 16, 1996

[54] BURGLARPROOF SYSTEM FOR AUTOMOTIVE VEHICLE

[75] Inventor: Kiyoyasu Wake, Yokohama, Japan

[73] Assignee: Miwa Lock Co., Ltd., Tokyo, Japan

[21] Appl. No.: 339,418

[22] Filed: Nov. 14, 1994

Related U.S. Application Data

[62] Division of Ser. No. 954,741, Sep. 30, 1992, abandoned.

[30] Foreign Application Priority Data

Oct. 1, 1991 [JP] Japan ................................. 3-280722
Nov. 25, 1991 [JP] Japan ................................. 3-104629

[51] Int. Cl.$^6$ .................................................. H04Q 1/00
[52] U.S. Cl. ................. 340/825.31; 180/287; 123/179.1; 123/198 R
[58] Field of Search ............. 180/287; 340/825.31; 361/70; 307/10.2, 10.4, 10.6; 123/179.1, 198 B, 198 R

[56] References Cited

U.S. PATENT DOCUMENTS

| | | | |
|---|---|---|---|
| 3,738,444 | 6/1973 | Roby | 180/114 |
| 4,088,878 | 5/1978 | Schasser | 235/436 |
| 4,112,292 | 9/1978 | Varvel et al. | 235/449 |
| 4,134,539 | 1/1979 | Hopkinson | 235/449 |
| 4,213,039 | 7/1980 | Schasser | 235/449 |
| 4,546,266 | 10/1985 | Zenick et al. | 307/10 AT |
| 4,673,914 | 6/1987 | Lee | 340/64 |
| 4,839,508 | 6/1989 | Frolov | 235/477 |
| 4,861,974 | 8/1989 | Kondo et al. | 235/475 |
| 5,006,843 | 4/1991 | Hauer | 340/825.31 |
| 5,254,842 | 10/1993 | Posner et al. | 340/825.31 |

FOREIGN PATENT DOCUMENTS

| | | |
|---|---|---|
| 0141011 | 5/1985 | European Pat. Off. |
| 0377816 | 7/1990 | European Pat. Off. |
| 2614129 | 10/1988 | France |
| 58-82379 | 5/1983 | Japan |
| 3186457 | 8/1991 | Japan |
| 497008 | 11/1970 | Switzerland |
| WO8103002 | 10/1981 | WIPO |
| WO8808381 | 11/1988 | WIPO |

*Primary Examiner*—Brian Zimmerman
*Attorney, Agent, or Firm*—Weingarten, Schurgin, Gagnebin & Hayes

[57] ABSTRACT

A burglarproof system for automotive vehicle which precludes a burglar from improperly starting the engine of an automotive vehicle using a duplicate key or short-circuiting a starter circuit. A magnetic card having a plurality of permanent magnets buried wherein and representing a predetermined password, and a card reader reading the poles and arrangement of the permanent magnets appearing on the upper surface of the magnetic card. One embodiment reads the password in a static reading mode. A second embodiment reads the password during movement of the magnetic card. A password comparator of the burglarproof system compares the password of the magnetic card with the predetermined password. A coincidence signal from the comparator establishes an electric circuit required for starting the engine of the automotive vehicle. A terminal cover made of insulator and covering the starter switch terminal and an electric wire from an electric battery are screwed to an end surface of a pull switch having a starter switch terminal and a battery connecting terminal both extending from the surface. A second starter switch terminal passes through the terminal cover. A double-core electric wire having a sheath grounded to the body of the automotive vehicle passes into the terminal cover. One end of one core is connected with the starter switch terminal and one end of the other core is connected with the second starter switch terminal. The other end of both cores is connected with a switch of the burglarproof system.

5 Claims, 11 Drawing Sheets

BURGLARPROOF SYSTEM FOR AUTOMOTIVE VEHICLE

This application is a division of U.S. application Ser. No. 07/954,741, filed Sep. 30, 1992, now abandoned.

BACKGROUND OF THE INVENTION

1. Field of the Invention

The present invention relates to a burglarproof system for automotive vehicle.

2. Description of the Related Art

Japanese unexamined patent application publication No. 186457/91 discloses a prior-art burglarproof system for automotive vehicle in which the outer cylinder of a magnetic cylinder has a tumbler switch disposed near a steering wheel of an automotive vehicle and closed in cooperation with a magnetic tumbler, the magnetic tumbler operating against a tumbler spring in cooperation with a magnetic key inserted into a keyway defined in the inner cylinder of the magnetic cylinder and in which an AND logic connects the tumbler switch to a conventional ignition system switch disposed near the magnetic cylinder and in which a control means consisting of an MPU receives outputs of the AND logic and controls a fuel injector, an igniter and an ignition capacitor.

Therefore, since the prior-art burglarproof system employs the magnetic cylinder disposed near the steering wheel and an automotive operator actuates the tumbler switch using part of key magnets of the magnetic key inserted into the magnetic cylinder, there is a drawback in that a third person (i.e., burglar) which has duplicated the magnetic key can improperly start the automotive vehicle although the employment of the AND logic appear to provide a double security.

SUMMARY OF THE INVENTION

Therefore, an object of the present invention is to provide a burglarproof system for automotive vehicle precluding a burglar from using a duplicated key or a direct connecting of a circuit by an electric wire to an improper start of an automotive vehicle.

In order to achieve this object, a first embodiment of the present invention comprises: a magnetic card, the magnetic card including a nonmagnetic board and a plurality of permanent magnets buried in the board in a fixed order, the magnetic card storing a password by means of presence or absence of the permanent magnets or a combination of directions of magnetization of the permanent magnets; a card reader mounted in an automotive vehicle and including a magnetic sensor, the magnetic sensor sensing the directions of magnetization of the permanent magnets when the magnetic card has been inserted into the card reader; a comparator comparing the password which has been read by the card reader with a predetermined reference password, the comparator producing a coincidence signal when the two passwords coincide with each other; and a switch controlled by the comparator and controlling an electric circuit required for running of the automotive vehicle.

A second embodiment of the present invention comprises: a magnetic card, the magnetic card including a nonmagnetic board and a plurality of permanent magnets buried in the board in a fixed order, the magnetic card storing a password by means of presence or absence of the permanent magnets or a combination of directions of magnetization of the permanent magnets; a card reader mounted in an automotive vehicle, the card reader including a first magnetic sensor sensing directions of magnetization of the permanent magnets of the magnetic card which has been inserted into the card reader and a strobe signal sensor made with a second magnetic sensor sensing one row of permanent magnets each having a predetermined direction of magnetization, both the first magnetic sensor and the strobe signal sensor being positioned opposite to permanent magnets arranged near to the transverse central axis of the magnetic card which has been inserted into the card reader; a comparator comparing the password read by the card reader with a predetermined reference password and producing a coincidence signal when the two passwords coincide with each other; and a switch controlled by the comparator and controlling an electric circuit required for running of the automotive vehicle.

A third embodiment of the present invention provides a starter system of automotive vehicle in which an end surface of a pull switch fastened to a cell motor has a starter switch terminal and a bolt-shaped battery connecting terminal both the terminals projecting from said end surface of the pull switch, an electric lead wire from an electric battery is screwed to the battery connecting terminal, and an electric wire from the starter switch terminal is connected to a starter relay, the starter system of automotive vehicle comprising: a contacting portion in contact with said end surface of the pull switch, a terminal cover made of insulator and covering the starter switch terminal, said contacting portion of the terminal cover having an opening through which the battery connecting terminal passes, an electric wire from the battery being screwed to the battery connecting terminal extending from the terminal cover through the opening whereby the terminal cover is fastened to said end surface of the pull switch; a second starter switch terminal passing through the terminal cover; two ends of the cores at one end of a double-core electric wire which has a sheath and passes into the terminal cover, one end of one of the cores being connected to the first starter switch within the terminal cover, one end of the other ends of the cores being connected to an internal end of the second starter switch terminal passing into the terminal cover, an electric wire connected to the starter relay being connected to an external end of the second starter terminal, the other end of the double-core electric wire being connected to a switch of the burglarproof system for automotive vehicle and the sheath being grounded to the body of automotive vehicle.

1) Since the magnetic card of the first embodiment has permanent magnets buried therein and having an arrangement corresponding to the password, the magnetic card has a high reluctance and cannot experience a trouble that a usual magnet destroys the password of the magnetic card as in the case of a conventional magnetic card using a magnetic tape which has a reluctance as low as approximately 650 oersteds.

2) Since the magnetic card employs the permanent magnets and the card reader employs no precision magnetic read head, the burglarproof system for automotive vehicle is tough to vandalism. In particular, since the card reader of the burglarproof system of the first embodiment statically reads the magnetic card, a driver of automotive vehicle need not insert the magnetic card into the card reader at a fixed speed which is within a predetermined range as of a conventional magnetic card having a magnetic tape which is read by a magnetic read head and the card reading by the card reader is free from an error even if the magnetic card is roughly inserted into the card reader.

3) Since the card reader of the burglarproof system of the second embodiment dynamically reads the magnetic card, the card reader must employ only one row of the magnetic sensors and a manufacturing cost for the card reader is low.

4) The burglarproof systems of the first and second embodiments can fully preclude a burglar from improperly starting the engine of automotive vehicle using a duplicate key or short-circuiting a key switch.

5) The burglarproof system of the third embodiment can apply a positive potential of the battery directly to the starter switch terminal. In addition, even if a burglar desires to remove the terminal cover to disclose the starter switch terminal and apply the positive potential of the battery to start the engine of automotive vehicle, he must connect the electric wire to the battery terminal again after removing the terminal cover, which requires a very long time so that he almost cannot start the engine in a short time.

DESCRIPTION OF THE PREFERRED EMBODIMENTS

Preferred embodiments of the present invention will be described with reference to the drawings hereinafter.

Figure 1:
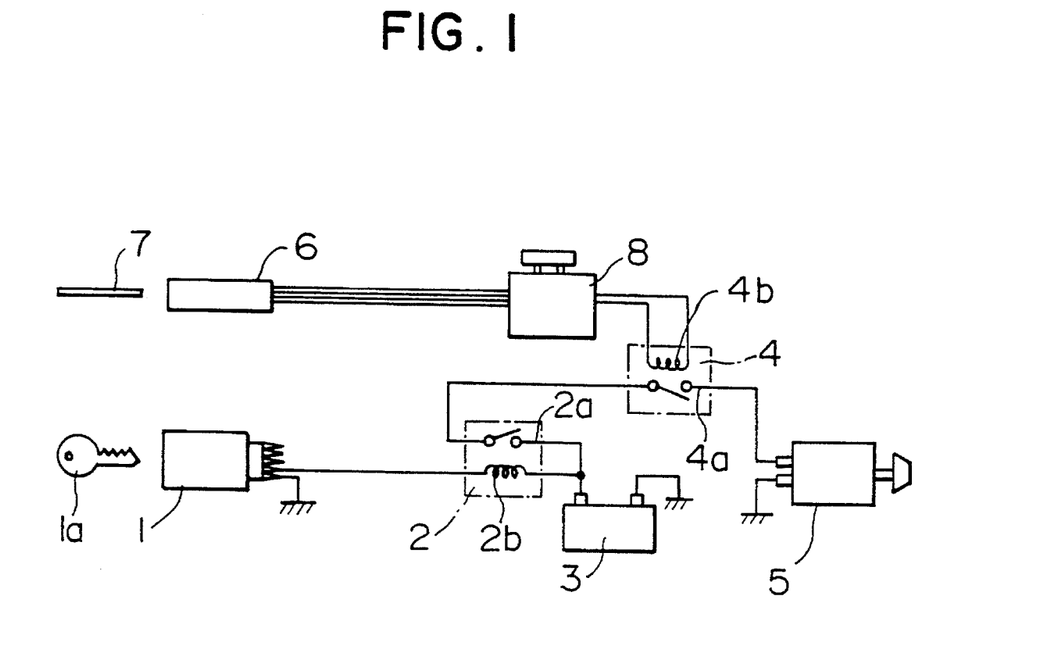
FIG. 1 is a schematic diagram of the overall configuration of a burglarproof system for automotive vehicle according to a first embodiment of the present invention.

As shown in FIG. 1, in accordance with the overall configuration of a burglarproof system for automotive vehicle according to a first embodiment of the present invention, a cylinder 1 is electrically connected to an electric battery 3 through an exciting coil 2b of a second starter relay 2 and a cell motor 5 is electrically connected to the battery 3 through a series of a switch 4a of a first starter relay 4 and a switch 2a of the second starter relay 2.

A card reader 6 receiving a magnetic card 7 is electrically connected to a password comparator 8. An output of the comparator 8 is connected to the terminal of an exciting coil 4b of the first starter relay 4.

Figure 2:
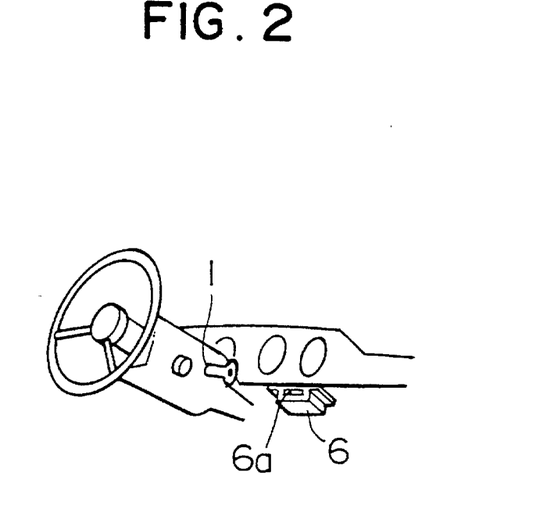
FIG. 2 is a perspective view of a card reader of the burglarproof system of FIG. 1 mounted in an automotive vehicle.

As shown in FIG. 2, the card reader 6 having a slot 6a into which the magnetic card 7 is inserted and the cylinder 1 are mounted within an automotive vehicle near an instrument panel.

Figure 3:
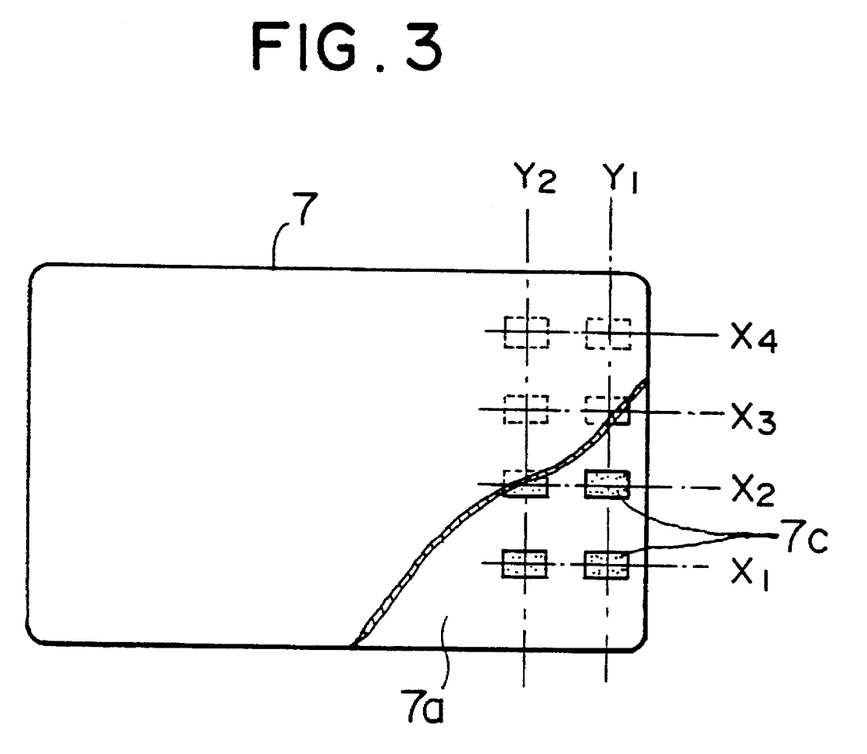
FIG. 3 is a cutaway plan view of a magnetic card of the burglarproof system of FIG. 1.
Figure 4:
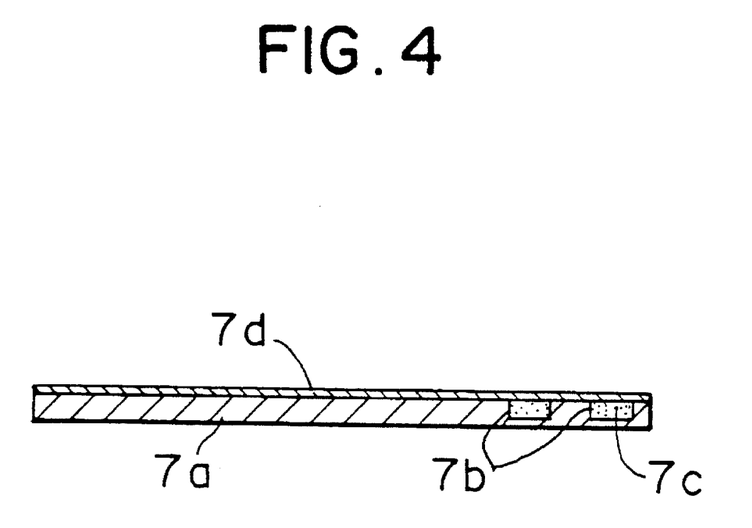
FIG. 4 is a longitudinal section of the magnetic card of FIG. 3.

As shown in FIGS. 3 and 4, the magnetic card 7 comprises a nonmagnetic board 7a having rectangular recesses 7b defined at intersections of columns $X_1$, $X_2$, $X_3$ and $X_4$ and rows $Y_1$ and $Y_2$, permanent magnets 7c buried in the recesses 7b, and a nonmagnetic covering sheet 7d attached to the upper surface of the board 7a.

Covering sheet 7d side north or south poles of the permanent magnets 7c indicate 0 or 1 of a bit and are weighted in binary number by their positions to provide 256 (=the eighth power of 2) kinds of passwords at maximum.

Figure 5:
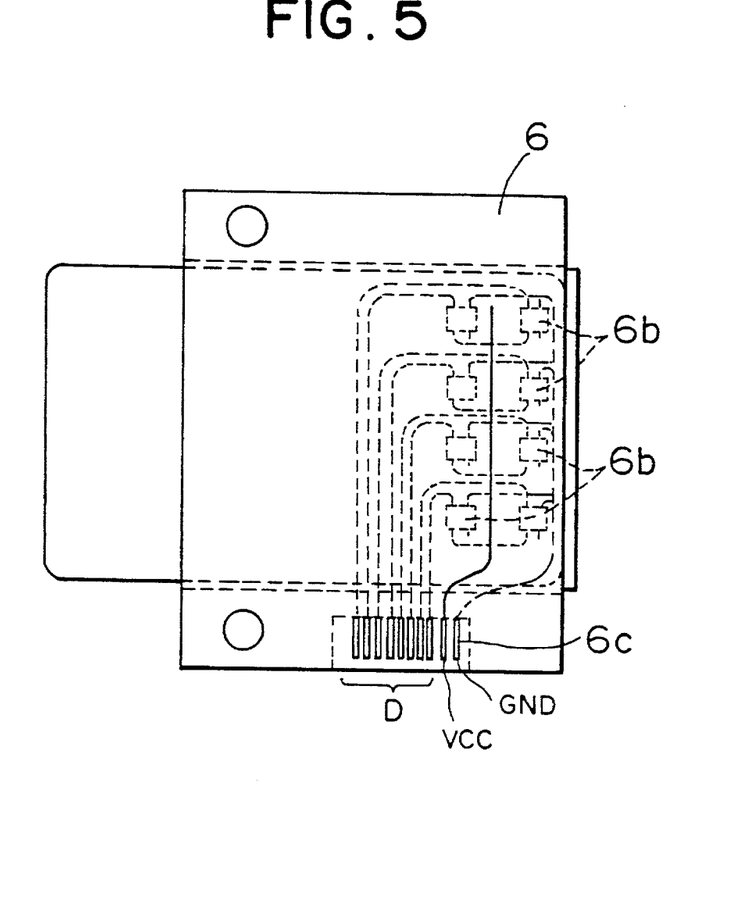
FIG. 5 is a plan view of a state in which the magnetic card of FIG. 3 has been inserted into the card reader of FIG. 1.
Figure 6:
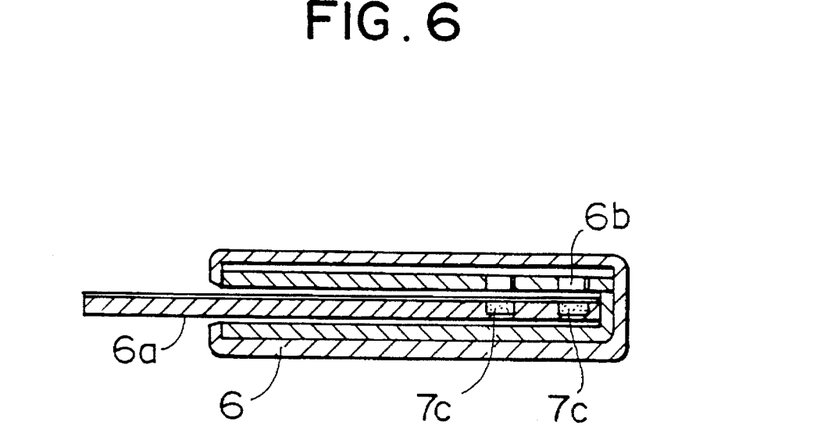
FIG. 6 is a longitudinal section of the state of FIG. 5.

As best shown in FIGS. 5 and 6, the card reader 6 comprises a box-shaped casing the front side of which has a horizontally extending slot 6a for receiving the magnetic card 7, magnetic sensors 6b each comprising, e.g., a Hall IC and positioned above the permanent magnets 7c of the magnetic card 7 which has been inserted through the slot 6a, a fist pin 6c applying a predetermined volt Vcc to the magnetic sensors 6b, a second pin 6c to the ground and other eight pins 6c connected to the outputs of the magnetic sensors 6b and producing eight-bit signals of eight bits D0 to D7.

Figure 7:
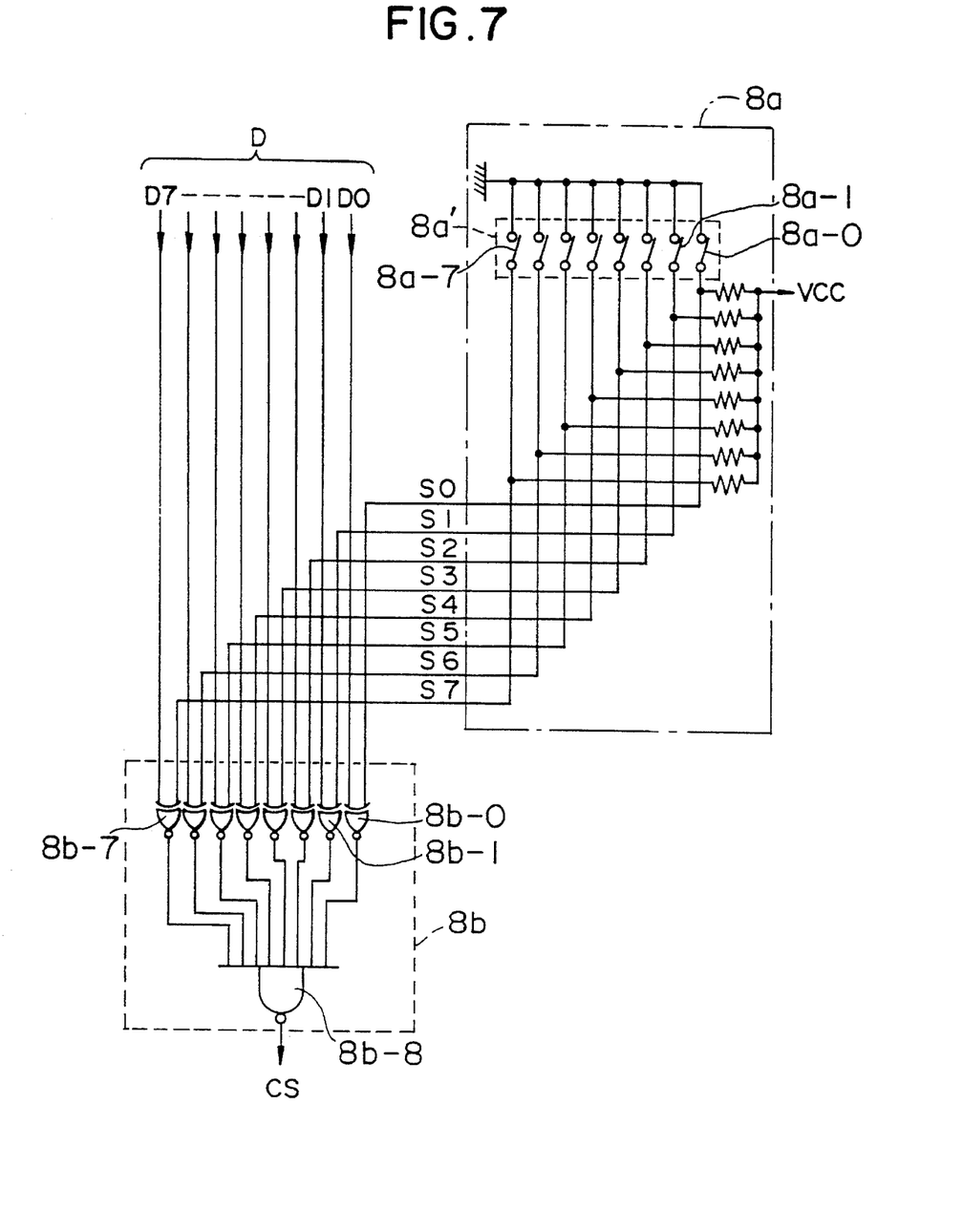
FIG. 7 is a circuit diagram of a password comparator of the card reader of FIG. 2.

As shown in FIG. 7, the comparator 8 comprises a reference password setter 8a comprising an 8-bit DIP switch 8a' and an exclusive NOR gate array 8b. First inputs of the exclusive NOR gates 8b-0 to 8B-7 of the exclusive NOR gate array 8b are connected to the output terminals 8a-0 to 8a-7 of the DIP switch 8a'. Outputs of the exclusive NOR gates 8b-0 to 8b-7 are applied to an AND gate 8b-8. A coincidence signal CS from the comparator 8 is applied to the exciting coil 4b of the first starter relay 4.

In the operation of the burglarproof system of the first embodiment, the permanent magnets 7c of the magnetic card 7 are magnetized so that a selected combination of a magnetization of the permanent magnets 7c represents a predetermined password to be used, and the DIP switch 8a' of the reference password setter 8a is set so as to represent the predetermined password.

When a driver desires to drive an automotive vehicle, he first inserts the magnetic card 7 through the slot 6a into the card reader 6 mounted in front of a driver sheet.

When the magnetic card 7 has been full inserted into the card reader 6, the magnetic sensors 6b right above the permanent magnets 7c of the magnetic card 7 apply the outputs D-0 to D-7 corresponding to the password of the magnetic card 7 to the exclusive NOR gates 8b of the comparator 8. Since the outputs S0 to S7 of the output terminals 8*a*-0 to 8*a*-7 of the DIP switch 8*a*' of the reference password setter 8*a*are applied to the exclusive NOR gate array 8*b*, each of the outputs D-0 to D-7 of the magnetic sensors 6*b* and corresponding one of the outputs S0 to S7 of the output terminals 8*a*-0 to 8*a*-7 of the DIP switch 8*a*' coincide with each other and the AND gate 8*b*-8 outputs the coincidence signal CS which excites the exciting coil 4*b* of the first starter relay 4 to close the switch 4*a*.

Accordingly, once the driver has inserted a key 1*a* into the cylinder 1 and rotates the key 1*a* to a predetermined position, a power switch (not shown) attached to the cylinder 1 is closed and then a current from the battery 3 excites the exciting coil 2*b* of the second starter relay 2 to close the switch 2*a*. At this time, a circuit from the battery 3 to the cell motor 5 is established so that the cell motor 5 starts the engine of the automotive vehicle.

On the other hand, when the driver inserts an improper magnetic card, e.g., a magnetic card having a different password into the card reader 6, the outputs D-0 to D-7 of the magnetic sensors 6*b* different from the predetermined password are applied to the exclusive NOR gate array 8*b* of the comparator 8, so that each of the outputs D-0 to D-7 of the magnetic sensors 6*b* cannot coincide with corresponding one of the out puts S0 to S7 of the output terminals 8*a*-0 to 8*a*-7 of the DIP switch 8*a*' of the reference password setter 8*a*. Thus, the AND gate 8*b*-8 does not ultimately produce the coincidence signal CS. Since the exciting coil 4*b* of the first starter relay 4 is accordingly not excited, the switch 4*a* of the first starter relay 4 connected in series to the switch 2*a* of the second starter relay 2 continues opening and the cell motor 5 cannot start when the driver has inserted the key 1*a* into the cylinder 1 and rotated it to the predetermined position to close the switch 2*a* of the second starter relay 2. That is, the burglarproof system for automotive vehicle according to the first embodiment of the present invention normally operates.

The first embodiment of the present invention employs Hall ICs for the magnetic sensors 6*b*, however, may employ reed switches urged by biassing magnets. In addition, the first embodiment of the present invention connects the first starter relay 4 in series to the cell motor 5, however, it may connect the first starter relay 4 in series to a circuit for an igniter or a circuit for controlling a fuel injector. In addition, the first embodiment of the present invention employs a discrete device for the comparator 8, however, it may replace the comparator 8 with a software program executed by a configuration comprising a microprocessor (MPU).

Figure 8:
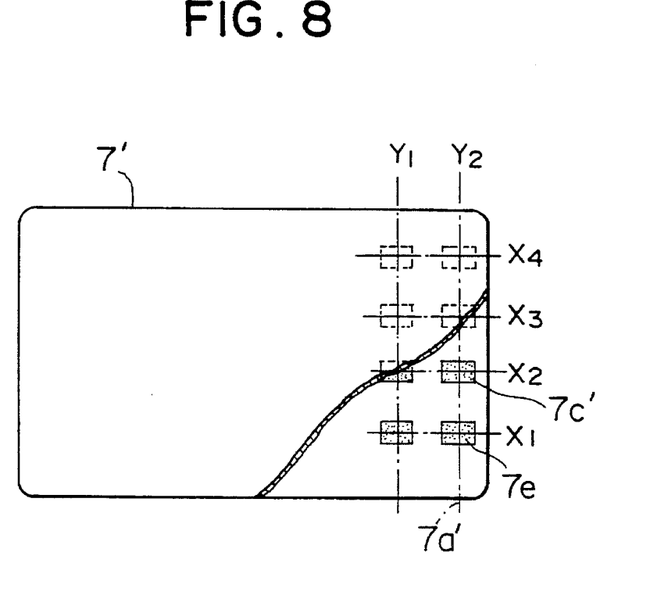
FIG. 8 is a plan view of a magnetic card of a burglarproof system for automotive vehicle of a second embodiment of the present invention.

FIG. 8 is a cutaway plan view of a magnetic card 7' according to a second embodiment of the present invention. Two permanent magnets 7*e* of the column $X_1$ extending in the direction of insertion of the magnetic card 7' constitute strobe signal producing magnets. For example, the upper pole of a strobe signal producing magnet 7*e* of a first row $Y_1$ from the front edge of the magnetic card 7' constitutes the north pole and the upper pole of a strobe signal producing magnet 7*e* of a second row $Y_2$ from the front edge of the magnetic card 7' constitutes the sough pole so that a card reader 6' can read the identifications of the rows $Y_1$ and $Y_2$.

Figure 9:
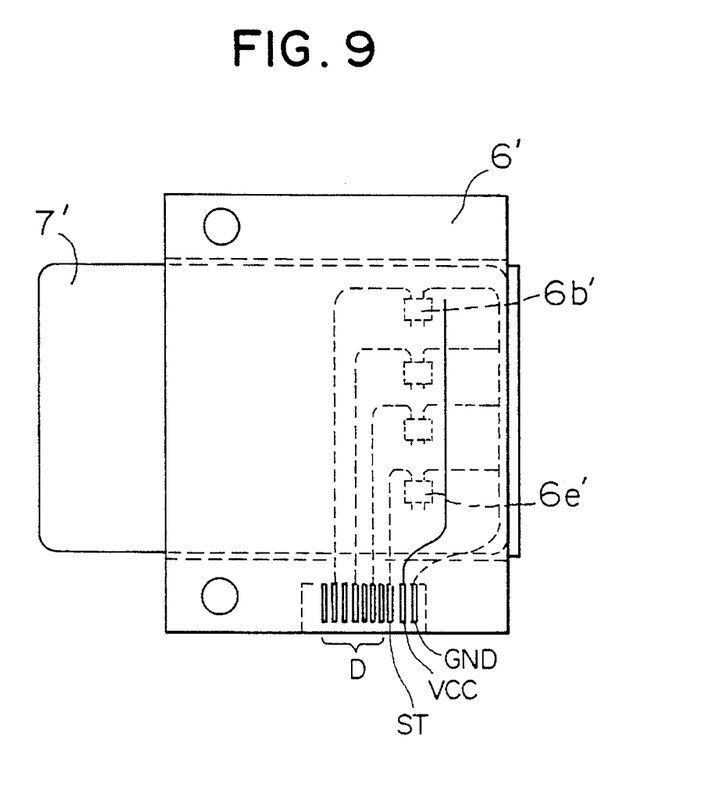
FIG. 9 is a plan view of a state in which the magnetic card of FIG. 8 has been inserted into a card reader of the burglarproof system for automotive vehicle of the second embodiment.

As shown in FIG. 9, the card reader 6' comprises magnetic sensors 6*b*' right above permanent magnets 7*c*' of the second row $Y_2$ from the front edge of the magnetic card 7', and a strobe signal sensor 6*e*' made with a magnetic sensor and right above the strobe signal producing magnet 7*e* of the second row $Y_2$ from the front edge of the magnetic card 7' when the magnetic card 7' has been full inserted into the card reader 6'. The magnetic sensors 6*b*' and the strobe signal sensor 6*e*' are connected to a terminal of an electric power source Vcc and a ground terminal GND.

Figure 10:
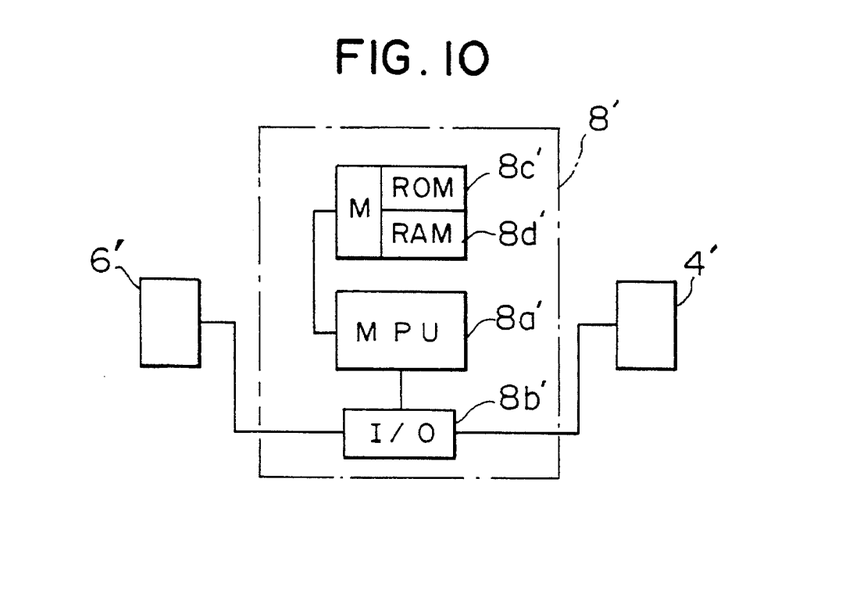
FIG. 10 is a block diagram of a password comparator of the card reader of FIG. 9.

As shown in FIG. 10, outputs D and ST of the magnetic sensors 6*b*' and the strobe signal sensor 6*e*' are applied to an I/O port 8*b*' of a comparator 8' comprising MPU 8*a*' as a main part. A memory M comprising a ROM 8*c*' and a RAM 8*d*' is connected to the MPU 8*a*'. The I/O port 8*b*' is connected to the exciting coil 4*b*' of the first starter relay 4'. Other configurations of the burglarproof system for automotive vehicle according to the second embodiment are essentially identical to those of the burglarproof system for automotive vehicle according to the first embodiment. Thus, the descriptions of the other configurations will not be repeated. The RAM 8*d*' of the memory M previously stores a predetermined reference password entered by means of a DIP switch or data input unit (not shown).

In the operation of the burglarproof system of the second embodiment, the driver of the automotive vehicle first inserts the magnetic card 7' into the card reader 6' mounted in the body of the automotive vehicle in front of the driver seat when the driver desires to drive the automotive vehicle.

When the permanent magnets 7*c*' and the strobe signal producing magnet 7*e* of the first row $Y_1$ of the magnetic card 7' have reached positions right below the magnetic sensors 6*b*' and the strobe signal sensor 6*e*', the output of 1 of the strobe signal sensor 6*e*' opposite to the strobe signal producing magnet 7*e* and the outputs of the magnetic sensors 6*b*' opposite to the permanent magnets 7*c*' of the first row $Y_1$ are applied to the comparator 8.

When the permanent magnets 7*c*' and the strobe signal producing magnet 7*e* of the second row $Y_2$ of the magnetic card 7' have reached positions right below the magnetic sensors 6*b*' and the strobe signal sensor 6*e*', the output of 1 of the strobe signal sensor 6*e*' opposite to the strobe signal producing magnet 7*e* and the outputs of the magnetic sensors 6*b*' opposite to the permanent magnets 7*c*' of the second row $Y_2$ are applied to the comparator 8.

Figure 11:
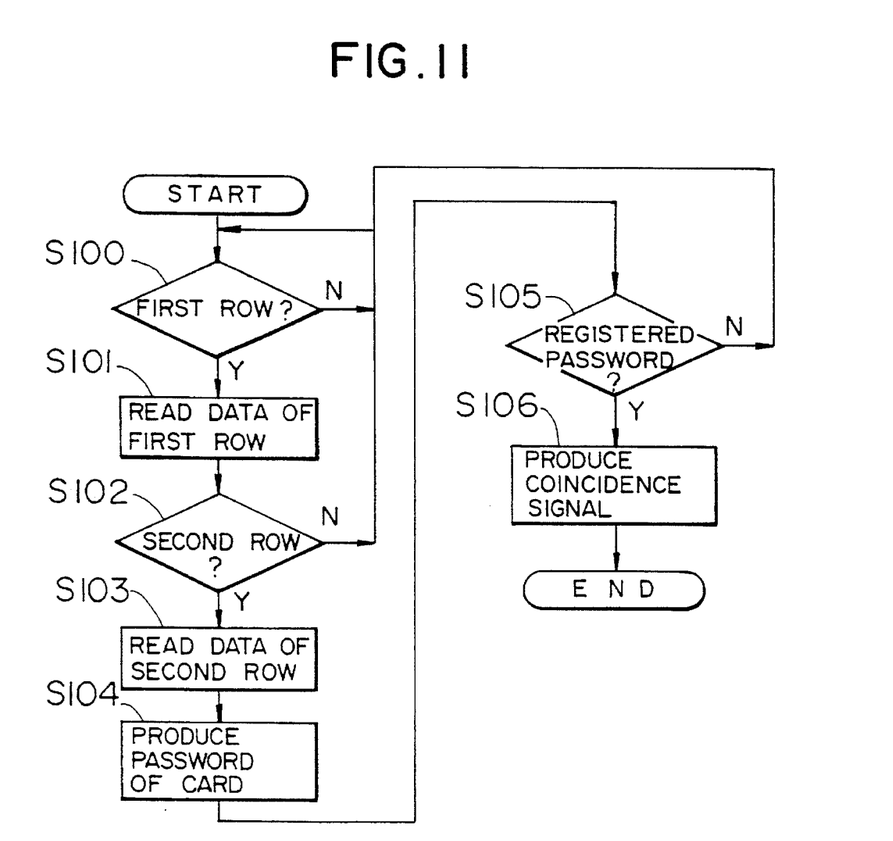
FIG. 11 is a flowchart of a signal processing by the password comparator of FIG. 10.

The comparator 8' determines by the value of 0 or 1 whether or not time series signals and the strobe signal ST from the card reader 6' are signals from the permanent magnets 7*c*' and 7*e* of the first row $Y_1$ or second row $Y_2$ and by the flowchart of FIG. 11 whether or not the password of the magnetic card 7' coincide with the predetermined reference password stored in the RAM 8*c*'.

In detail, the flowchart is as follows: At STEP 100, the MPU 8*a*' of the comparator 8 determines that the permanent magnets 7*c*' of the first row $Y_1$ have reached positions right below the magnetic sensors 6*b*' when the strobe signal sensor 6*e*' has signalled 0. When the strobe signal sensor 6*e*' has signalled 1, the program returns to the start. At STEP 101, the MPU 8*a*' reads the outputs D0, D1 and D2 of the magnetic sensors 6*b*' opposite to the permanent magnets 7*c*' of the first row $Y_1$ and latches the outputs D0, D1 and D2. At STEP 102, when the driver has further inserted the magnetic card 7' into the card reader 6' and the strobe signal producing magnet 7*e* has reached positions right below the strobe signal sensor 6*e*' so that the strobe signal sensor 6*e*' has signalled 1, the MPU 8*a*' determines that the permanent magnets 7*c*' of the second row $Y_2$ have reached positions right below the magnetic sensors 6*b*'. When the strobe signal sensor 6*e*' continues signalling 0, the program returns to the start. At STEP 103, the MPU 8*a*' reads the outputs D3, D4 and D5 of the magnetic sensors 6*e*' opposite to the permanent magnets 7*c*' of the second row $Y_2$ and latches the outputs D3, D4 and D5. At STEP 104, the MPU 8*a*' processes the data latched at STEPS 101 and 103 and produces the password of the magnetic card 7'. At STEP 105, the MPU 8a' determines whether or not the password of the magnetic card 7' coincides with the predetermined reference password. At STEP 106, the MPU 8a' produces the coincidence signal when the two passwords have coincided with each other. Otherwise, the program returns from STEP 105 to the start.

In short, when the magnetic card 7' is proper, a current passes through an exciting coil 4b' of the first starter relay 4' to close the switch 4a'.

Since operations other than the above description are substantially the same as corresponding operations of burglarproof system of the first embodiment, descriptions of the these operations are not repeated.

Since the burglarproof system of the second embodiment shares the use of the magnetic card with that of the first embodiment, the configuration of the burglarproof system of the second embodiment matches 6-bit signals. However, a reduction of spacings between permanent magnets of the magnetic card can match a burglarproof system for automotive vehicle with 8-bit signals.

Figure 16:
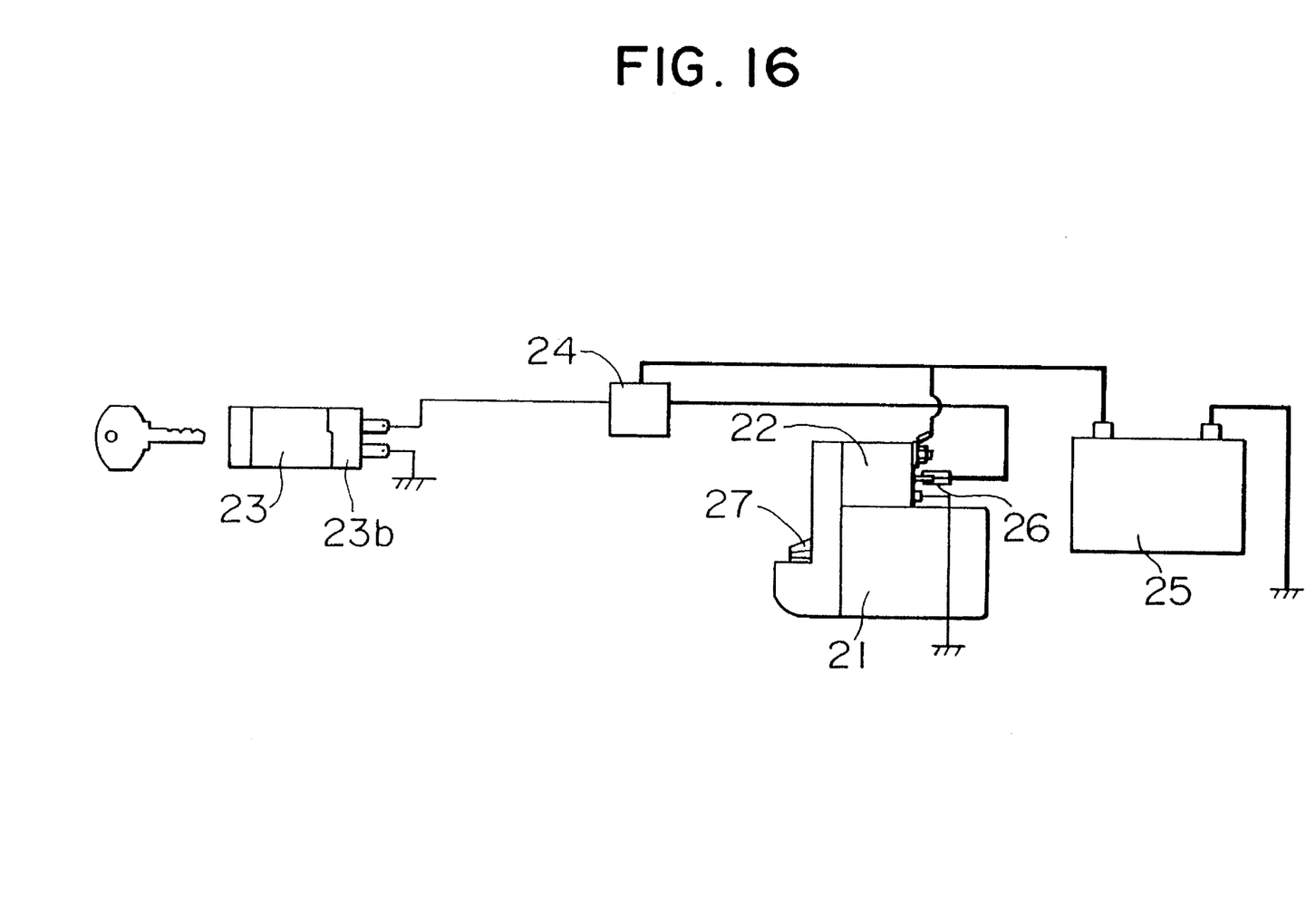
FIG. 16 is a schematic diagram of the overall configuration of a prior-art engine starter system for automotive vehicle.
Figure 17:
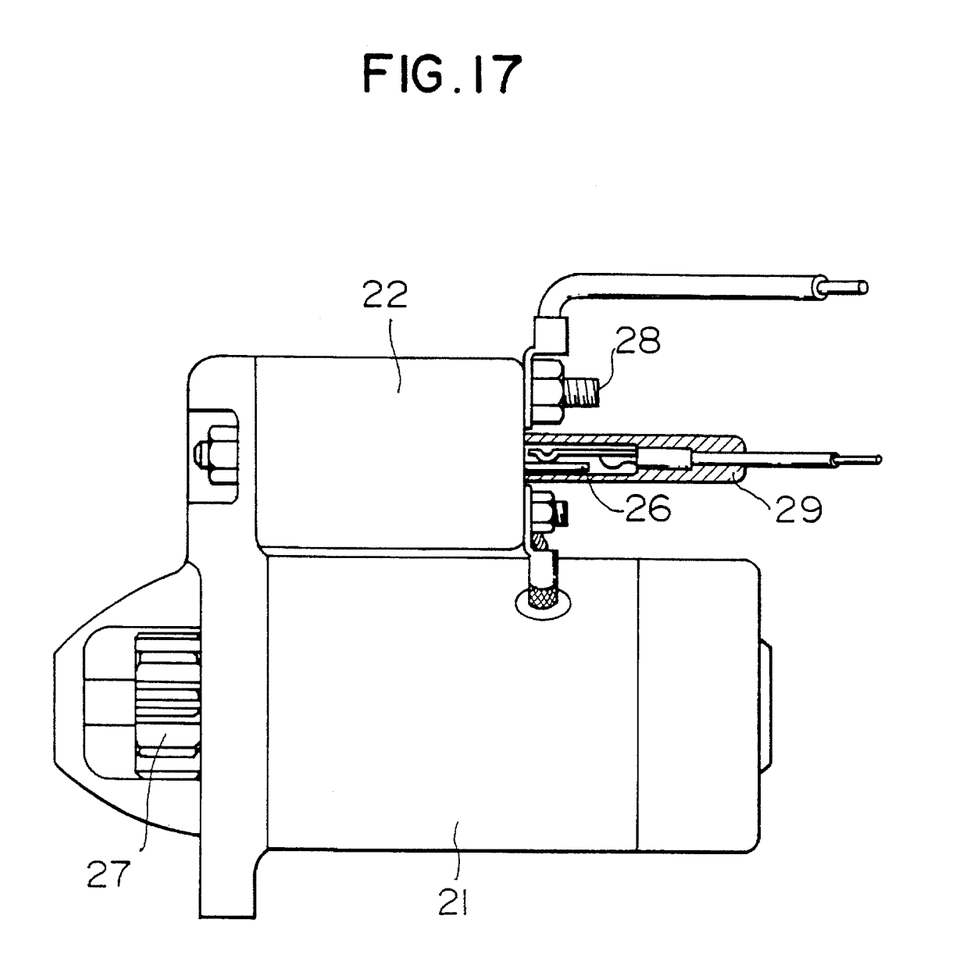
FIG. 17 is a partially sectioned side elevation of a prior-art assembly of a starter motor and a pull motor.

FIG. 16 shows the configuration of a conventional starter system of automotive vehicle. FIG. 17 shows a cell motor of the conventional starter system of automotive vehicle.

As shown in FIG. 16, a cell motor or starter 21 has a starter or pull switch 22 attached thereto and extending in the same direction as the cell motor 21. Inserting a proper key 23a into a cylinder 23 and then rotating the key 23a in the predetermined direction close a key switch 23b attached to the cylinder 23 to energize the starter relay 24. The positive terminal of a battery 25 is connected to a starter switch terminal 26 of the pull switch 22 through the starter relay 24.

Then, the pull switch 22 operates, so that a pinion gear 27 of the cell motor 21 is projected to engage a reduction gear of the engine of automotive vehicle and the cell motor 21 receives a current through the battery terminal 28 of the pull switch 22 connected to the positive terminal of the battery 25 and starts the engine.

Since a current passing through the starter switch terminal 26 is relatively low, the starter switch terminal 26 is bar-shaped, projected from an end surface of the pull switch 22 and in contact with a plate-like contact of a connector 29 as shown in FIG. 17.

Generally, a trick of improperly starting the engine of automotive vehicle for a burglary of automotive vehicle is that a burglar, who does not have the proper key 23a, short circuits the two terminals of the key switch 23b attached to the cylinder 23.

In order to preclude the trick, there is a burglarproof system in which the line passing through the starter relay 24 between the key switch 23b and the starter switch terminal 26 of the pull switch 22 has a switch provided there intermediate and a magnetic card controls opening and closing of this line in the same manner as in the first embodiment.

However, the above system entails a drawback that as seen in FIGS. 16 and 17 if the burglar pulls the connector 29 away from the starter switch terminal 26 to disclose the starter switch terminal 26 and then couples the positive terminal of the battery 25 with the starter switch terminal 26, then he can easily improperly start the engine.

Figure 12:
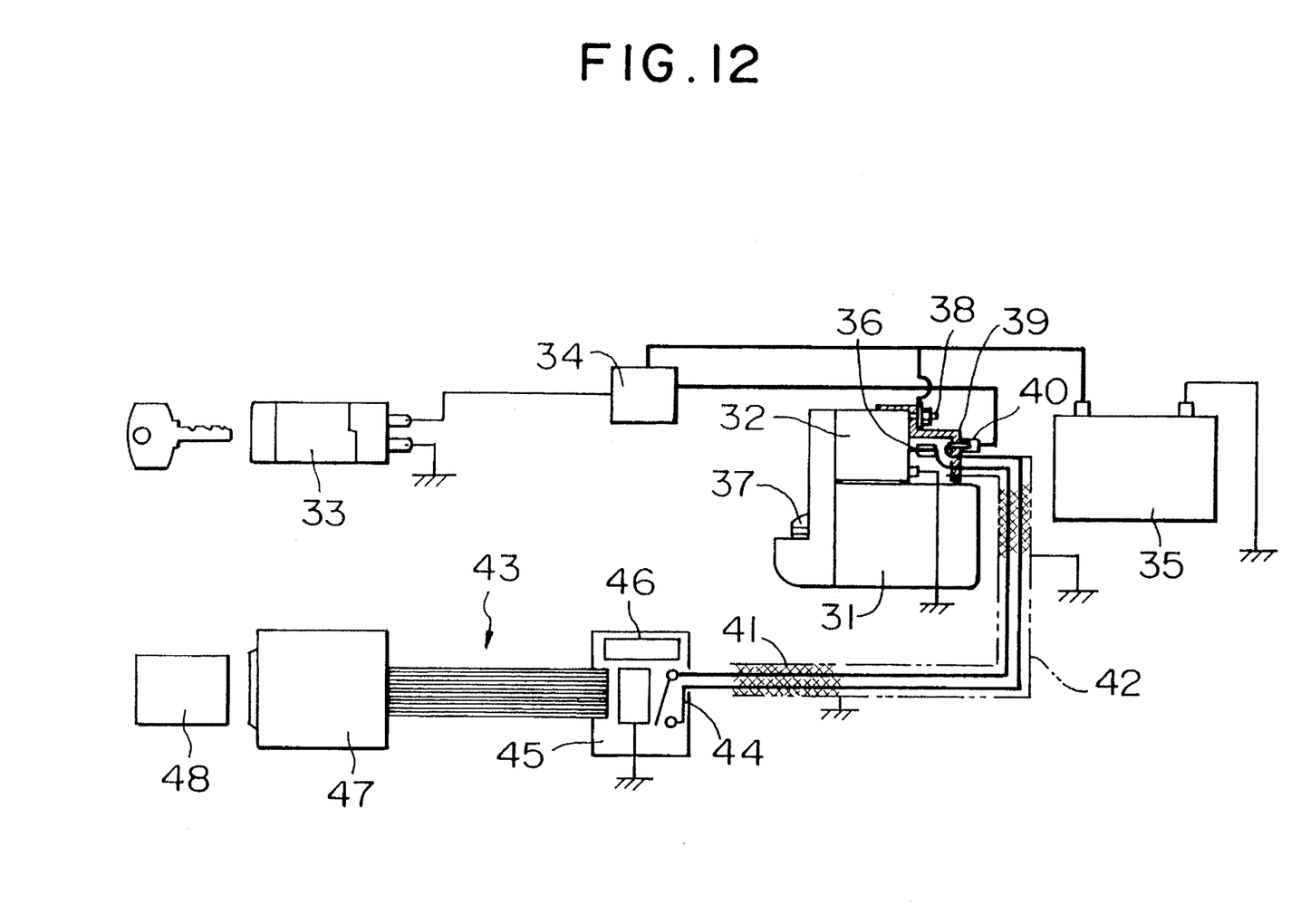
FIG. 12 is a schematic diagram of the overall configuration of a burglarproof system for automotive vehicle of a third embodiment of the present invention.

An object of a third embodiment of the present invention is to eliminate this drawback. FIG. 12 shows the overall configuration of a burglarproof system for automotive vehicle according to the third embodiment. As shown in FIGS. 12–15, a terminal cover 39 is made of insulator and so shaped that a part of the cylindrical wall of a single-bottomed hollow cylinder is axially cut away to preclude a contact with the outer surface of the cell motor 31 and the bottom of the single-bottomed hollow cylinder has a sidewall in parallel to the axial edges of the cutaway part and an arc-shaped bottom in parallel to the circular open edge of the single-bottomed hollow cylinder, which constitutes a shoulder of the single-bottomed hollow cylinder.

Figure 13:
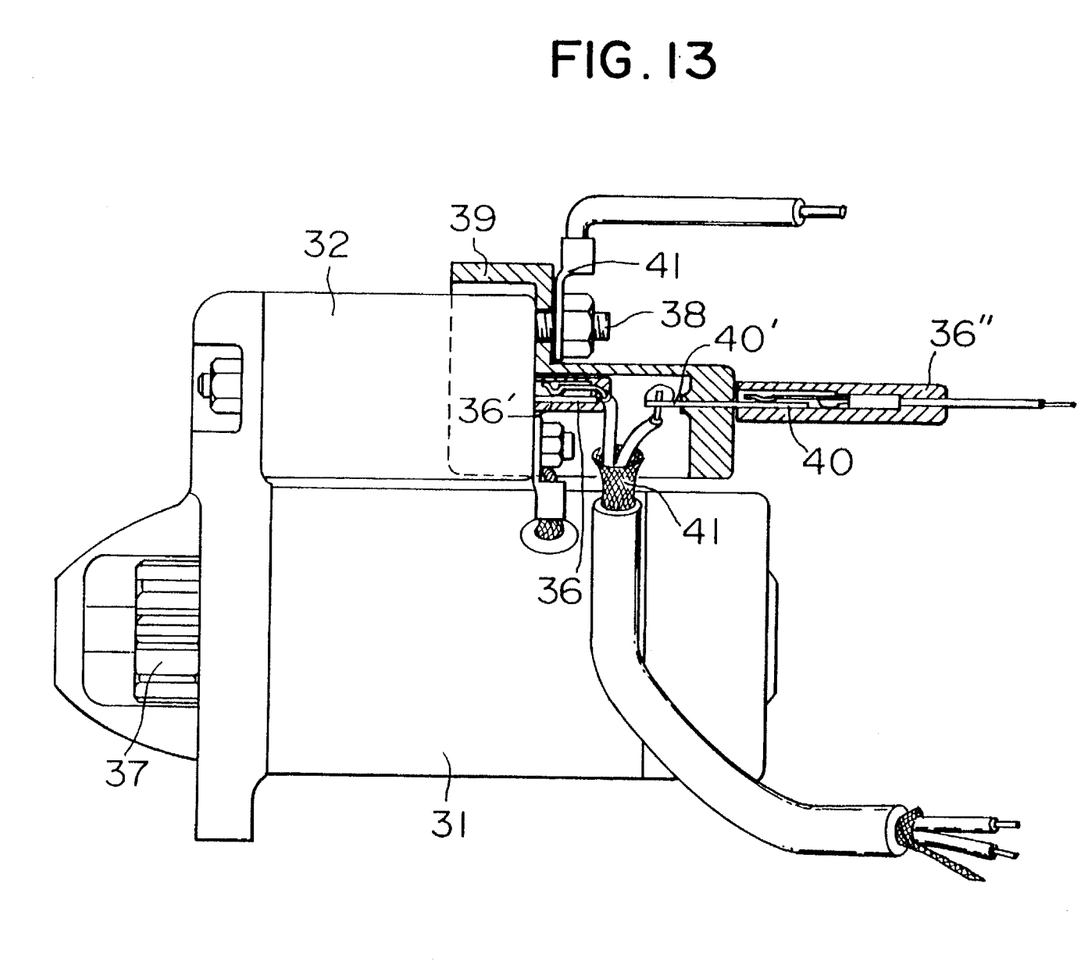
FIG. 13 is a partially sectioned side elevation of an assembly of a starter motor and a pull switch of the burglarproof system of FIG. 12.

The shoulder of the terminal cover 39 constitutes a contacting portion 39a, as shown in FIG. 13, so that the interior surface of the contacting portion 39a is in contact with the end surface of the pull switch 32 from which a battery connecting terminal 38 extends through a contacting portion 39a when the terminal cover 39 is attached to the pull switch 32.

Figure 14:
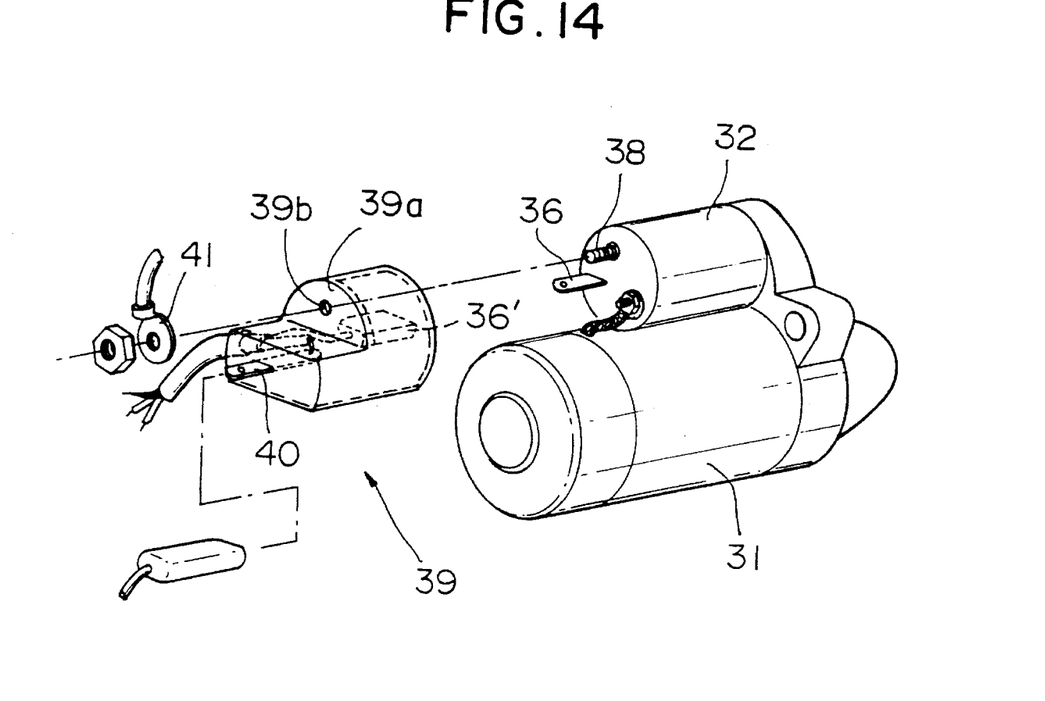
FIG. 14 is an exploded perspective view of an assembly of the starter motor and a terminal cover of the burglarproof system of FIG. 12.
Figure 15:
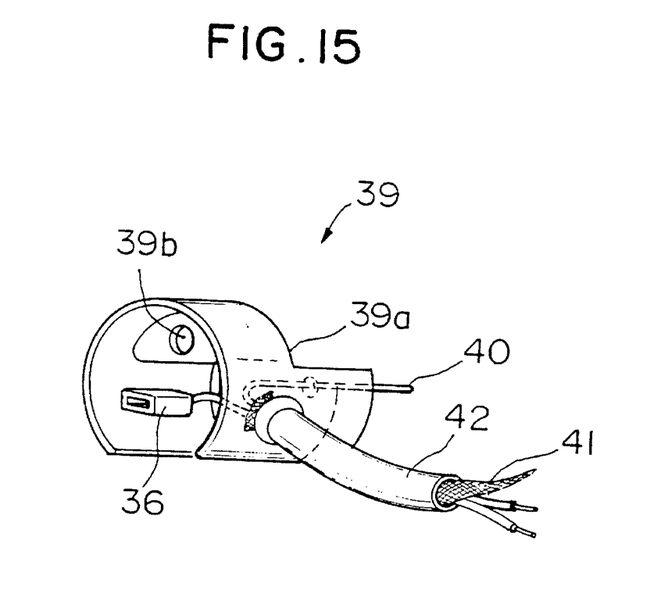
FIG. 15 is a perspective view of the terminal cover of FIG. 14.

As best shown in FIGS. 14 and 15, the contacting portion 39a of the terminal cover 39 defines a terminal passing through-hole 39b through which the battery connecting terminal 38 of the pull switch 32 passes. When the terminal cover 39 is attached to the pull switch 32, the battery terminal 38 passing out of the terminal cover 39 through the terminal passing through-hole 39b passes through a crimp-style terminal 41 crimping an electric lead wire from the battery 35 and both the terminal cover 39 and the crimp-style terminal 41 are screwed to the end surface of the pull switch 32, as shown in FIGS. 13 and 14. As shown in FIGS. 13 and 14, a second bar-shaped starter switch terminal 40 passes axially through the terminal cover 39 screwed to the pull switch 32.

As shown in FIGS. 12–15, one end of a double-core electric wire 42 sheathed with a sheath 41 passes into the terminal cover 39. One end of one core at the one end of the double-core electric wire 42 is soldered to an internal end 40' of the second starter terminal 40 passing into the terminal cover 39 and one end of the other core at the one end of the double-core electric wire 42 is connected with the connector 36' which fits the starter switch 36. A connector 36" which has conventionally fitted the starter switch terminal 36 now fits an external end of the second starter switch 40 projecting from the terminal cover 39.

As shown in FIG. 12, the sheath 41 of the double-core electric wire 42 is grounded to the body of automotive vehicle and the other end of the sheath 41 is connected with the starter switch 44 mounted within the burglarproof system 43. In other words, the starter switch 44 of the burglarproof system 43 is provided intermediate the line between the starter switch terminal 36 mounted within the terminal cover 39 and the second starter switch terminal 40 mounted on the terminal cover 39.

The configuration of the burglarproof system 43 of the third embodiment is the same as that of the first or second embodiment. A password comparator 45 including a reference password generator 46 is electrically connected to a card reader 47 receiving a magnetic card 48.

What is claimed is:

1. A burglarproof system for a starter system of an automotive vehicle including a pull switch fastened to a cell motor, a starter switch terminal and a bolt-shaped battery connecting terminal projecting from an end surface of the pull switch, an electric lead wire from an electric battery screwed to the battery connecting terminal, and an electric wire from the starter switch terminal connected to a starter relay, the burglarproof system comprising:

a terminal cover made of an insulator and covering the starter switch terminal;

a contacting portion of said terminal cover in contact with said end surface of the pull switch, said contacting portion having an opening through which the battery connecting terminal extends;

the electric lead wire screwed to the battery connecting terminal fastening said terminal cover to said end surface of the pull switch;

a second starter switch terminal passing through the terminal cover; and a double-core electric wire having a sheath and passing into the terminal cover, one end of one of the cores being connected to the first starter switch within the terminal cover, one end of the other core being connected to an internal end of the second starter switch terminal, an external end of the second starter switch terminal being connected to the electric wire connected to the starter relay, the other end of the double-core electric wire being connected to a switch of the burglarproof system and the sheath being grounded to the body of the automotive vehicle.

2. A terminal cover securable to a cell motor pull switch, said pull switch having a starter switch terminal and a battery connecting terminal protruding from an end face of said pull switch, said pull switch mounted adjacent said cell motor, said terminal cover comprising:

a housing accepting and surrounding a portion of said pull switch and said end face, said housing defining a hole through which said battery connecting terminal protrudes when said pull switch is received within said housing; and a second starter switch terminal integral with said housing, said second starter switch terminal having a first end inside said housing and a second end outside said housing.

3. The terminal cover of claim 2, wherein said housing separates said starter switch terminal from said battery connecting terminal when said pull switch is received within said housing.

4. The terminal cover of claim 2, wherein said hole defined by said housing is in a housing portion that abuts said end face of said pull switch when said pull switch is received within said housing.

5. The terminal cover of claim 2, further comprising a shielded double-core electric wire having a first core connected to said first end of said second starter switch terminal and a second core terminating in a connector for connection to said starter switch terminal, wherein said electric wire provides an indirect electrical path between said starter switch terminal and said second starter switch terminal.

* * * * *